UNITED STATES PATENT OFFICE.

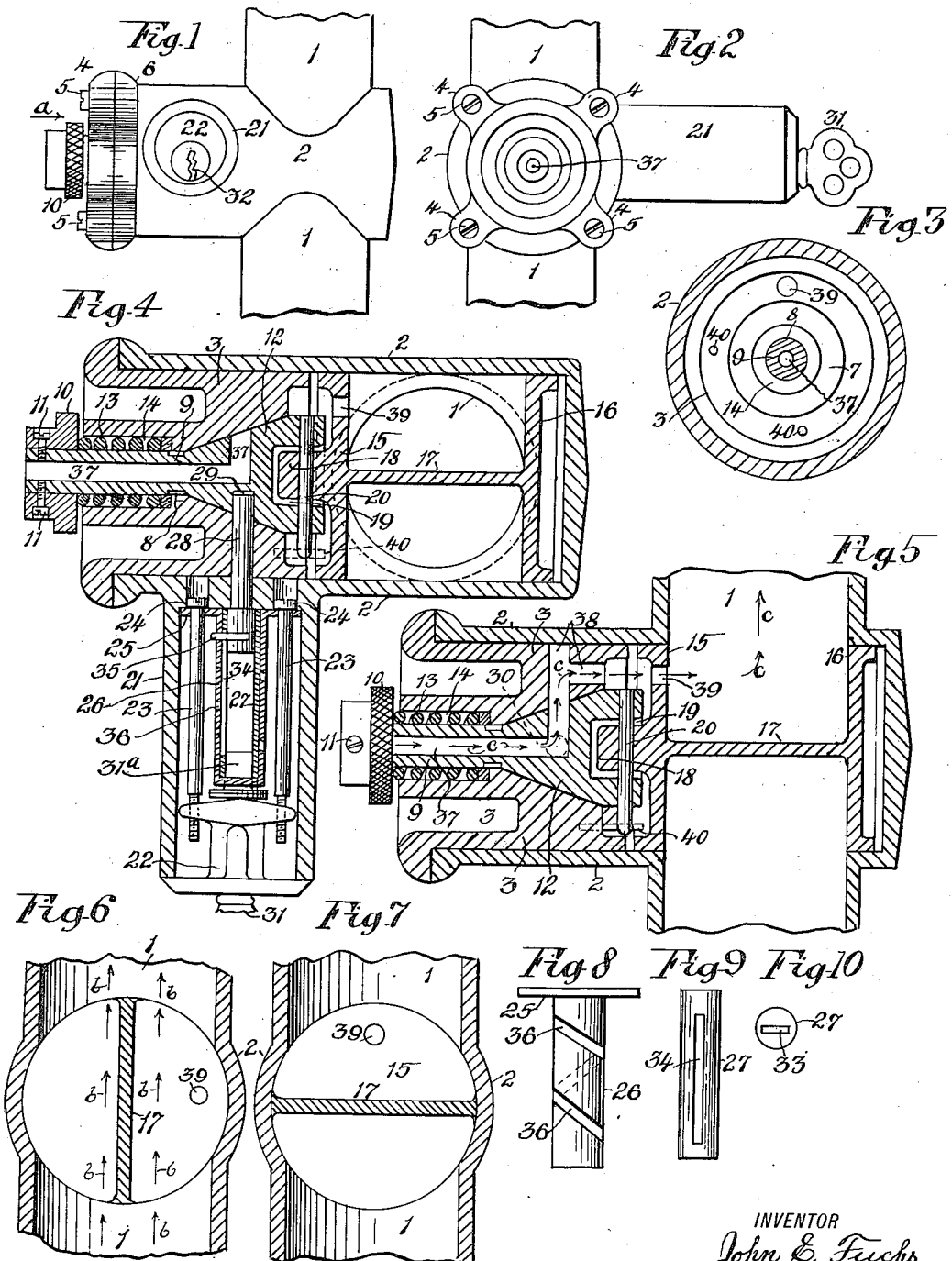

JOHN E. FUCHS, OF STAMFORD, CONNECTICUT.

FUEL-SHUT-OFF MECHANISM FOR AUTOMOBILES.

1,303,878.　　　　　　Specification of Letters Patent.　　Patented May 20, 1919.

Application filed July 31, 1918. Serial No. 247,581.

*To all whom it may concern:*

Be it known that I, JOHN E. FUCHS, citizen of the United States, residing at Stamford, in the county of Fairfield and State of Connecticut, have invented certain new and useful Improvements in Fuel-Shut-Off Mechanism for Automobiles; and I do hereby declare the following to be a full, clear, and exact description of the invention, such as will enable others skilled in the art to which it appertains to make and use the same.

My invention relates to improved mechanism for controlling the fuel supply of automobiles, and it consists of a specially constructed device connected with the manifold of the engine to temporarily shut off the mixture of air and gas from the cylinders, and thus prevent an unauthorized removal of the automobile.

The accompanying drawings fully set forth the construction and operation of the device.

Figure 1 represents a broken view of the manifold, and the housing in which is located the mixture controlling mechanism;

Fig. 2 is a view looking in the direction of arrow *a* of Fig. 1;

Fig. 3 is an enlarged detail view of the inside face of the plug for closing the mouth of the housing and a cross sectional view of the housing and valve operating spindle;

Fig. 4 is an enlarged central sectional view of the housing and a lateral extension thereof in which is located the lock mechanism, showing the position of the several operative parts when the flow of the mixture is uninterrupted;

Fig. 5 is an enlarged central view of the housing, valve and its operative mechanism showing the position of the valve with respect to the manifold when the fuel supply is shut off, also broken sectional view of the manifold;

Fig. 6 is an enlarged broken sectional view of the manifold, end view of one of the heads of the valve mechanism, and sectional view of the valve showing its position with respect to the manifold when the flow of the mixture to the cylinders is uninterrupted;

Fig. 7 is a similar view of the manifold showing the valve set to shut off the flow of the mixture; and Figs. 8, 9 and 10 represent detail views of the parts relating to the lock mechanism.

1 is the manifold through which the mixture of gas and air passes from the carbureter to the engine—not shown. Various types of manifolds are in use, therefore the term "manifold" includes any inclosed space between the carbureter and the engine cylinders, whether the housing or tube inclosing such space forms a part of the carbureter, the cylinders, or is a detached construction.

2 is a housing projecting at right angles to the manifold and integral therewith. Within this housing is located the principal mechanism for controlling the flow of the mixture, comprising the plug 3, having ears 4, in which are located the screws 5 for securing it to the flange 6 of the housing. This plug is seated within the housing and its inner end is provided with the tapered recess or conical seat 7, Fig. 3, and the central hole 8 leading outward from the bottom of the recess. The shut-off valve controlling spindle comprises the stem 9 adapted to operate freely in the hole 8 of the plug 3. On the outer projecting end of the stem is located the knurled head 10 secured to the stem by screws 11. The head portion 12 of the spindle is tapered to fit the tapered mouth 7 of the plug, and 13 is a spring located within the recess 14 of the plug for the purpose of normally maintaining the taper head of the spindle firmly against its seat.

The shut-off valve comprises the heads 15 and 16 connected together by the web 17, which web forms the valve proper. The head 15 has the hub 18, which hub projects within the recess 19 of the spindle head, and the pin 20 connects the valve head with the spindle.

21 is a tubular right angle extension of the housing 2, and it contains the means for locking and unlocking the mechanism of the housing in any of its adjusted positions. 22 represents a common tumbler lock secured to the said extension by the bolts 23, whose heads 24 contact with the outer surface of the flange 25 of the tube 26, secured at the bottom of the extension 21.

Within the flanged tube 26 is rotatably located the shell 27, and within this shell is located the outer end of the locking bolt 28, whose inner end is adapted to register with one or the other of the recesses 29—30, Figs. 4 and 5, of the tapered spindle head 12.

The manner of engaging the locking bolt with the spindle head is as follows: When the key 31 is inserted in the key slot 32, Fig. 1, it will actuate the member 31ª, Fig. 4, of the lock. This member being located in the slot 33, Fig. 10, of the shell 27, will cause said shell to rotate. This shell is also provided with the longitudinal slot 34 to receive the pin 35 carried by the locking bolt. This pin also projects through the spiral slot 36 of the tube 26 and follows down said slot to withdraw the locking bolt when the key is turned in the proper direction for this purpose.

The spindle has the air passage or port 37 through its stem 9 and into its taper head 12. The plug 3 has a similar air passage 38, and the head 15 of the valve body has the hole 39 adapted to be brought to register with the other air passages.

When the mixture is passing from the manifold to the cylinders, the mechanism in the housing will be locked in the position shown in Fig. 4, with the valve 17 in vertical position as also shown in Fig. 6, so that the mixture will flow on each side of the valve in the direction as shown by the arrows $b$. The hole or port 39 in the valve head 15 will then be in the position shown in said Fig. 6.

To shut off the flow of the mixture, the locking bolt 28 is withdrawn by means of the key, as before described, which will release the spindle so it can be forced inward far enough to unseat its tapered head 12, and when thus unseated, the spindle is free to be rotated until the locking bolt can register with the recess 30, Fig. 5, when it is forced therein through the medium of the key. This will place the valve 17 at right angles to its former position and shut off the flow of mixture as shown in Figs. 5 and 7. Rotating the mechanism, just described, will bring the hole 39 in the valve head to register with the air passages 38 of the plug, and 37 of the spindle. 40, Figs. 3, 4 and 5, are stop pins located in the inner face of the plug 3 to be alternately engaged by the long pin 20 to indicate the open and closed positions of the valve. Cranking the engine, while the mixture is thus shut off, would only result in drawing in a large quantity of surplus air through the before mentioned air passages, as indicated by arrows $c$, which will destroy the vacuum in the cylinders to such an extent that the pistons could not draw the mixture by the valve. As the valve 17 must operate freely, there would necessarily be more or less space surrounding it through which sufficient mixture might be drawn to start the engine were it not for the air relief thus provided. When the air passages are closed, the taper head 12 of the spindle is held so firmly against its seat by the spring 13 that no air can escape by the spindle when the engine is working.

Locating the means for shutting off the mixture in the manifold tube, located between the carbureter and cylinders, requires less mechanism than would be needed in order to install the same in any other part of the machine.

Other well known means for seating the spindle could be employed that would be as effective as the taper head.

Having thus described my invention, what I claim is:—

1. Fuel controlling mechanism for internal explosive engines comprising a housing projecting laterally from the manifold of the engine, a plug secured in the mouth of the housing having a central bore terminating in a conical seat in its inner end, a spindle having a stem operatively mounted in the bore of the plug and a conical head for the conical seat of the plug, a spring normally maintaining the head in said seat, a valve operatively connected with the spindle and registering with the interior of the manifold and adapted to shut off the fuel supply from the engine, means for locking the valve in its open or closed positions, and means outside of the plug for operating the spindle and valve.

2. Fuel controlling mechanism for internal explosive engines comprising a housing projecting laterally from the manifold of the engine, a plug secured in the mouth of the housing having a central bore and a conical seat in its inner end, a spindle having a stem operatively mounted in the bore of the plug and a conical head for the conical seat of the plug, a fuel shut off valve registering with the interior of the manifold, the valve having a head and an air port, the spindle and plug having air passages adapted to register with the port of the valve head when the valve is closed, and means for locking the valve in its open and closed positions.

3. Fuel controlling means connected with the manifold of an internal explosive engine comprising a housing projecting from the manifold and integral therewith, a plug secured in the mouth of the housing, a fuel shut-off valve registering with the interior of the manifold, mechanism located in the housing for operating the valve to open and closed positions, said valve operating mechanism and plug having air passages adapted to communicate with the interior of the manifold only when the valve is closed, and means for locking the valve operating mechanism when the valve is in an open or closed position.

In testimony whereof I affix my signature.

JOHN E. FUCHS.